United States Patent
Xu

(10) Patent No.: US 12,179,606 B1
(45) Date of Patent: Dec. 31, 2024

(54) METHOD AND APPARATUS FOR MANAGING POWER BATTERY OF A VEHICLE, STORAGE MEDIUM AND ELECTRONIC DEVICE

(71) Applicant: Northwest Institute of Eco-Environment and Resources, Chinese Academy of Sciences, Lanzhou (CN)

(72) Inventor: Hao Xu, Lanzhou (CN)

(73) Assignee: Northwest Institute of Eco-Environment and Resources, Chinese Academy of Sciences, Lanzhou (CN)

( * ) Notice: Subject to any disclaimer, the term of this patent is extended or adjusted under 35 U.S.C. 154(b) by 0 days.

(21) Appl. No.: 18/774,235

(22) Filed: Jul. 16, 2024

(30) Foreign Application Priority Data

Aug. 23, 2023 (CN) .......................... 202311064924.3

(51) Int. Cl.
    *B60L 15/20* (2006.01)
    *B60L 58/10* (2019.01)
(52) U.S. Cl.
    CPC .......... *B60L 15/2045* (2013.01); *B60L 58/10* (2019.02); *B60L 2240/642* (2013.01)
(58) Field of Classification Search
    None
    See application file for complete search history.

(56) References Cited

U.S. PATENT DOCUMENTS

| | | | |
|---|---|---|---|
| 9,493,089 B2 * | 11/2016 | Shin | B60L 58/10 |
| 11,820,255 B2 * | 11/2023 | Rajaie | B60W 30/18127 |
| 2023/0278540 A1 * | 9/2023 | Kono | B60W 30/182 |
| | | | 701/22 |

FOREIGN PATENT DOCUMENTS

| | | |
|---|---|---|
| CN | 101834456 A | 9/2010 |
| CN | 103112360 A | 5/2013 |
| CN | 105691383 A | 6/2016 |
| CN | 110562237 A | 12/2019 |

(Continued)

OTHER PUBLICATIONS

Office Action, CN Patent Application No. 202311064924.3, dated Jan. 29, 2024, 13 pages.
Notice to Grant, CN Patent Application No. 202311064924.3, dated Apr. 21, 2024, 3 pages.

*Primary Examiner* — Todd Melton
(74) *Attorney, Agent, or Firm* — Casimir Jones, S.C.; Robert A. Goetz

(57) ABSTRACT

A method and an apparatus for managing power battery of vehicle, a storage medium and an electronic device are provided. The method includes: acquiring, when a target vehicle travels to a first target site, a target recovered electric quantity, the target recovered electric quantity is a total electric quantity that can be charged to the power battery by energy recovery for the target vehicle when passing through a target downhill road section, and the target downhill road section is a road section that has a downhill length greater than a second pre-set length and a downward gradient greater than a third pre-set gradient; driving, if a first electric quantity difference is smaller than the target recovered electric quantity, the target vehicle by the power battery, the first electric quantity difference is a difference between a total capacity of the power battery and a current electric quantity of the target vehicle.

7 Claims, 4 Drawing Sheets

When a target vehicle travels to a first target site, a target recovered electric quantity is acquired — S101

If a first electric quantity difference is smaller than the target recovered electric quantity, the target vehicle is driven by the power battery — S102

When the target vehicle travels to the starting point of the target downhill road section, the target vehicle is controlled to perform energy recovery — S107

(56) References Cited

FOREIGN PATENT DOCUMENTS

| CN | 116494986 | A | 7/2023 |
|----|-----------|---|--------|
| CN | 116542397 | A | 8/2023 |
| DE | 102016009931 | A1 | 2/2018 |

* cited by examiner

METHOD AND APPARATUS FOR MANAGING POWER BATTERY OF A VEHICLE, STORAGE MEDIUM AND ELECTRONIC DEVICE

CROSS-REFERENCE TO RELATED APPLICATION

The present disclosure claims the priority to the Chinese patent application with the filing No. 2023110649243 filed with the Chinese Patent Office on Aug. 23, 2023 and entitled "METHOD AND APPARATUS FOR MANAGING POWER BATTERY OF A VEHICLE, STORAGE MEDIUM AND ELECTRONIC DEVICE", the content of which is incorporated herein by reference in entirety.

TECHNICAL FIELD

The present disclosure relates to the field of batteries, and specifically to a method and an apparatus for managing a power battery of a vehicle, a storage medium and an electronic device.

BACKGROUND ART

With the development of modern vehicles towards intelligence and networking, the automatic control of electrodynamic vehicles has gained great improvement. However, the current automatic control focuses more on how to safely and reliably drive on the road, while algorithms involving in-vehicle energy management control strategies rarely consider driving routes in conjunction with a geographic information system.

Therefore, those skilled in the art start to focus on how to manage an in-power battery of a vehicle in conjunction with the geographic information system.

SUMMARY

The present disclosure aims at providing a method and an apparatus for managing a power battery of a vehicle, a storage medium and an electronic device, to at least partially address the above problems.

In order to achieve the above objective, the embodiments of the present disclosure adopt technical solutions as follows.

In the first aspect, embodiments of the present disclosure provide a method for managing a power battery of a vehicle, wherein the method includes: determining, based on a current position and an end point of a driving plan, a target road section of driving; acquiring a total consumed energy based on elevation information, traffic information and weather information about the target road section, wherein optionally, the elevation information includes a downhill length and a downhill gradient of a downhill road section, an uphill length and an uphill gradient of an uphill road section, a length of a flat road section, and the like. A consumed electric quantity and a recovered electric quantity of the target vehicle in each road section are acquired respectively, so that the total consumed energy can be determined.

In a second aspect, embodiments of the present disclosure provide a method for managing a power battery of a vehicle, wherein the method includes:
acquiring, when a target vehicle travels to a first target site, a target recovered electric quantity,
wherein the target recovered electric quantity is a total electric quantity can be charged to the power battery by energy recovery for the target vehicle when passing through a target downhill road section, the first target site is a site located at a first pre-set distance before a starting point of the target downhill road section, and the target downhill road section is a road section that has a downhill length greater than a second pre-set length and a downward gradient greater than a third pre-set gradient;
driving, if a first electric quantity difference is smaller than the target recovered electric quantity, the target vehicle by the power battery,
wherein the first electric quantity difference is a difference between a total capacity of the power battery and a current electric quantity of the target vehicle when traveling to the first target site; and
controlling, when the target vehicle travels to the starting point of the target downhill road section, the target vehicle to perform the energy recovery.

In a third aspect, embodiments of the present disclosure provides an apparatus for managing a power battery of a vehicle, wherein the apparatus includes:
a processing unit, configured to acquire, when a target vehicle travels to a first target site, a target recovered electric quantity,
wherein the target recovered electric quantity is a total electric quantity that can be charged to the power battery by energy recovery for the target vehicle when passing through a target downhill road section, the first target site is a site located at a first pre-set distance before a starting point of the target downhill road section, and the target downhill road section is a road section that has a downhill length greater than a second pre-set length and a downward gradient greater than a third pre-set gradient; and
a control unit, configured to control, if a first electric quantity difference is smaller than the target recovered electric quantity, the target vehicle to be driven by the power battery,
wherein the first electric quantity difference is a difference between a total capacity of the power battery and a current electric quantity of the target vehicle when traveling to the first target site;
the control unit is further configured to control, when the target vehicle travels to the starting point of the target downhill road section, the target vehicle to perform energy recovery.

In the fourth aspect, embodiments of the present disclosure provide a storage medium, storing a computer program, wherein when the computer program is executed by a processor, the above method is implemented.

In a fifth aspect, embodiments of the present disclosure provide an electronic device, including a processor and a memory, wherein the memory is configured to store one or more programs; and when the one or more programs are executed by the processor, the above method is implemented.

Compared with the prior art, the method and the apparatus for managing a power battery of a vehicle, the storage medium and the electronic device provided in the embodiments of the present disclosure provide include: acquiring, when the target vehicle travels to the first target site, the target recovered electric quantity, wherein the target recovered electric quantity is the total electric quantity that can be charged to the power battery by energy recovery for the target vehicle when passing through the target downhill road section, the first target site is the site located at the first pre-set distance before the starting point of the target downhill road section, and the target downhill road section is the road section with the downhill length greater than the second pre-set length and the downward gradient greater than the third pre-set gradient; driving, if the first electric quantity difference is smaller than the target recovered electric quantity, the target vehicle by the power battery, wherein the first electric quantity difference is the difference between the total capacity of the power battery and the current electric quantity of the target vehicle when traveling to the first target site; controlling, when the target vehicle travels to the starting point of the target downhill road section, the target vehicle to perform the energy recovery. Performing the energy recovery not only can save energy, but also can reduce wear of mechanical brake and unnecessary heat dissipation.

In order to make the above objectives, characteristics and advantages of the present disclosure more apparent and understandable, preferred embodiments are particularly illustrated in the following to give detailed description in conjunction with the drawings.

BRIEF DESCRIPTION OF DRAWINGS

In order to more clearly illustrate technical solutions of embodiments of the present disclosure, drawings which need to be used in the embodiments will be briefly introduced below. It is to be understood that the drawings merely show some embodiments of the present disclosure, and thus should not be considered as limitation to the scope. Those ordinarily skilled in the art still could obtain other relevant drawings according to these drawings, without using any inventive efforts.

Figure 1:
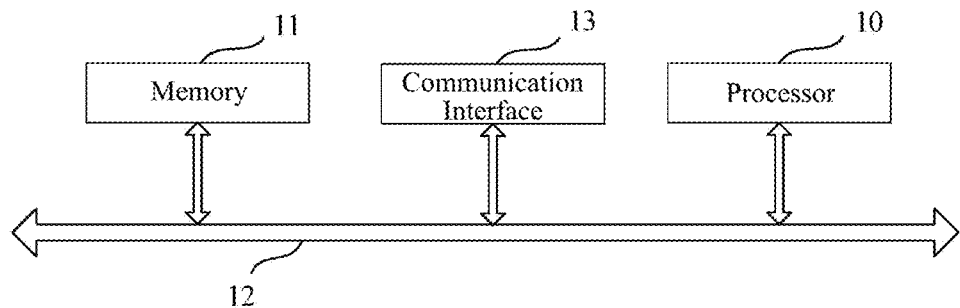
FIG. 1 is a structural schematic diagram of an electronic device provided in embodiments of the present disclosure.

In the drawings: 10—processor; 11—memory; 12—bus; 13—communication interface; 201—processing unit; 202—control unit.

DETAILED DESCRIPTION OF EMBODIMENTS

In order to make the objectives, technical solutions and advantages of the embodiments of the present disclosure more clear, the technical solutions in the embodiments of the present disclosure will be clearly and completely described below in combination with the drawings in the embodiments of the present disclosure. Apparently, only some but not all embodiments of the present disclosure are described. Generally, components in the embodiments of the present disclosure described and shown in the drawings herein may be arranged and designed in various different configurations.

Therefore, the following detailed description of the embodiments of the present disclosure provided in the drawings is not intended to limit the claimed scope of the present disclosure, but merely represents chosen embodiments of the present disclosure. All of other embodiments obtained by those ordinarily skilled in the art based on the embodiments in the present disclosure without using any inventive efforts shall fall within the scope of protection of the present disclosure.

It should be noted that like reference signs and letters represent like items in the following drawings, and thus, once a certain item is defined in one drawing, it is not needed to be further defined or explained in subsequent drawings. Meanwhile, in the description of the present disclosure, the terms such as "first" and "second" are merely used for distinguishing the description, but should not be construed as indicating or implying importance in the relativity.

It should be indicated that in the present disclosure, the relational terms such as first and second are merely used for distinguishing one entity or operation from another entity or operation, while it is not necessarily required or implied that these entities or operations have any such practical relation or order. Moreover, the terms such as "comprise", "contain" or any other variants thereof are intended to encompass non-exclusive inclusion, such that a process, a method, an article or a device including a series of elements includes not only those elements, but also includes other elements that are not explicitly listed, or further includes elements inherent in such process, method, article or device. Without more restrictions, an element defined with the wordings "including a . . . " does not exclude presence of other same elements in the process, method, article or device including said element.

In the description of the present disclosure, it should be indicated that orientation or positional relationships indicated by the terms such as "upper", "lower", "inner", and "outer" are based on orientation or positional relationships as shown in the drawings, or orientation or positional relationships of a product of the present disclosure when being conventionally placed in use, merely for facilitating describing the present disclosure and simplifying the description, rather than indicating or implying that related devices or elements have to be in a specific orientation or configured and operated in a specific orientation, and thus they should not be construed as limitation to the present disclosure.

In the description of the present disclosure, it should be further indicated that, unless otherwise specifically regulated and defined, the terms "provide" and "connect" is to be understood in a broad sense, for example, a connection may be a fixed connection, a detachable connection, or an integrated connection; it may be a mechanical connection or an electrical connection; it may be direct joining, indirect joining through an intermediary, or inner communication between two elements. Specific meanings of the above terms in the present disclosure could be understood by those ordinarily skilled in the art according to specific situations.

Some embodiments of the present disclosure are described in detail below in combination with the drawings. The following embodiments and features in the embodiments may be combined with each other without conflict.

With the development of electric vehicle technologies, the concept of energy recovery is introduced to electrically driven vehicles, such that the vehicles are not merely limited to energy consumption, but also perform energy recovery during downhill driving, and generate power to charge a power battery. Therefore, when a fully charged vehicle encounters continuous downhill road sections, energy cannot be recovered because the battery is fully charged, and thus the energy is wasted. In order to solve this technical problem, embodiments of the present disclosure provide a method for managing a power battery of a vehicle, which systematically plans, in conjunction with a geographic information system and big data information from a vehicle-mounted sensor, but not limited to an own vehicle sensor, energy charging and consumption of driving, and sufficiently recovers energy, thereby not only saving energy, but also reducing wear of mechanical brake and unnecessary heat dissipation.

Specifically, the embodiments of the present disclosure provide an electronic device, which may be an in-vehicle driving computer device or a server device in communicative connection with the driving computer device. It is to be understood that the server device can acquire, via interaction with a driving computer, vehicle driving information, travel plan, and the like. Referring to FIG. 1, it is a structural schematic diagram of the electronic device. The electronic device includes a processor 10, a memory 11, and a bus 12. The processor 10 and the memory 11 are connected through the bus 12. The processor 10 is configured to execute an executable module, such as a computer program, stored in the memory 11.

The processor 10 may be an integrated circuit chip that can process signals. In an implementation process, various steps of the method for managing a power battery of a vehicle may be implemented by an integrated logic circuit of hardware in the processor 10 or an instruction in a software form. The above processor 10 may be a general-purpose processor, including a central processing unit (CPU for short), a network processor (NP for short), etc., and may also be a digital signal processor (DSP for short), an application specific integrated circuit (ASIC for short), a field-programmable gate array (FPGA for short) or other programmable logic devices, discrete gates, transistor logic devices, or discrete hardware components.

The memory 11 may include a high-speed random access memory (RAM), and possibly also include a non-volatile memory, such as at least one disk memory.

The bus 12 may be an ISA (Industry Standard Architecture) bus, a PCI (Peripheral Component Interconnect) bus, an EISA (Extended Industry Standard Architecture) bus, or the like. The bus is only denoted by one bidirectional arrow in FIG. 1, but it does not mean that there is only one bus 12 or one type of bus 12.

The memory 11 is configured to store a program, for example, a program corresponding to an apparatus for managing a power battery of a vehicle. The apparatus for managing a power battery of a vehicle includes at least one software functional module that can be stored in the memory 11 in a form of software or firmware, or solidified in an operating system (OS) of the electronic device. The processor 10 executes, upon receipt of an execution instruction, the program so as to implement the method for managing a power battery of a vehicle.

Possibly, the electronic device provided in the embodiments of the present disclosure further includes a communication interface 13, and the communication interface 13 is connected to the processor 10 through the bus.

It is to be understood that the structure shown in FIG. 1 is merely a structural schematic diagram of part of the electronic device, while the electronic device may further include more or less components than those shown in FIG. 1, or have a configuration different from that shown in FIG. 1. Various components shown in FIG. 1 may be realized by hardware, software or a combination thereof.

Embodiments of the present disclosure provide a method for managing a power battery of a vehicle, which may be applied to, but not limited to, the electronic device shown in FIG. 1. For a specific process, reference can be made to FIG. 2. The method for managing a power battery of a vehicle includes: S101, S102 and S107, which are specifically illustrated as follows.

In S101, when a target vehicle travels to a first target site, a target recovered electric quantity is acquired.

In the above, the target recovered electric quantity is a total electric quantity that can be charged to the power battery by energy recovery for the target vehicle when passing through a target downhill road section, the first target site is a site located at a first pre-set distance before a starting point of the target downhill road section, a distance between the starting point of the target downhill road section and the first target site is equal to the first pre-set distance, and the target downhill road section is a road section that has a downhill length greater than a second pre-set length and a downward gradient greater than a third pre-set gradient.

Optionally, relevant information about the target downhill road section and a target uphill road section to be mentioned later can be acquired in conjunction with a geographic information system, and is further used for acquiring the target recovered electric quantity.

Figure 3:
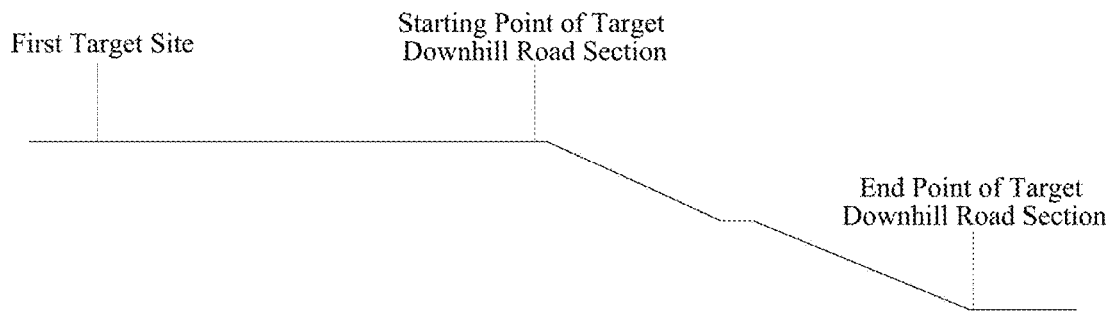
FIG. 3 is a schematic diagram of a first target site according to embodiments of the present disclosure.

Referring to FIG. 3, FIG. 3 is a schematic diagram of one type of the first target site provided in embodiments of the present disclosure. As shown in FIG. 3, in a driving plan (navigation route) of the target vehicle, the first target site is located in front of the target downhill road section, and is spaced apart from the starting point of the target downhill road section by the first pre-set distance, where the first pre-set distance is an appointed value configured in advance. It is to be noted that the target downhill road section may be composed of one or more continuous downhill road sections, for example, two continuous downhill road sections between the starting point and an end point of the target downhill road section constitute the target downhill road section in FIG. 3.

With regard to how to acquire the target recovered electric quantity, the embodiments of the present disclosure further provide a possible implementation. With reference to the following, S101 includes S101A and S101B, which are specifically illustrated as follows.

In S101A, estimated traffic information corresponding to the target downhill road section when the target vehicle travels to the target downhill road section is acquired, wherein the estimated traffic information includes any one or more of an estimated average speed, an estimated total number of vehicles and an estimated degree of congestion.

In S101B, based on the estimated traffic information, the downhill length, a downhill gradient and corresponding weather information of the target downhill road section, the target recovered electric quantity is acquired.

It is to be understood that the estimated traffic information may affect a proportion of vehicle braking or energy recovery braking chosen by the vehicle, thereby affecting the target recovered electric quantity. The weather information, such as raining or not and road humidity, also affects braking selection, and thus affects the target recovered electric quantity.

In S102, if a first electric quantity difference is smaller than the target recovered electric quantity, the target vehicle is driven by the power battery.

In the above, the first electric quantity difference is a difference between a total capacity of the power battery and a current electric quantity of the target vehicle when traveling to the first target site.

It is to be understood that, when the first electric quantity difference is smaller than the target recovered electric quantity, if the energy recovery is directly performed, the recovered electric quantity will overflow and be wasted. Therefore, through driving the target vehicle by the power battery, the electric quantity in the power battery is further consumed, so that a gap of the electric quantity in the power battery becomes larger, which can avoid as much overflow and waste as possible when the energy recovery is performed in the downhill road section.

In S107, when the target vehicle travels to the starting point of the target downhill road section, the target vehicle is controlled to perform the energy recovery.

It is to be understood that performing energy recovery not only can save energy, but also can reduce wear of mechanical brake and unnecessary heat dissipation.

To sum up, the embodiments of the present disclosure provide a method for managing a power battery of a vehicle, including: acquiring, when the target vehicle travels to the first target site, the target recovered electric quantity, wherein the target recovered electric quantity is the total electric quantity that can be charged to the power battery by energy recovery for the target vehicle when passing through the target downhill road section, the distance between the starting point of the target downhill road section and the first target site is equal to the first pre-set distance, and the target downhill road section is the road section that has the downhill length greater than the second pre-set length and the downward gradient greater than the third pre-set gradient; if the first electric quantity difference is smaller than the target recovered electric quantity, the target vehicle is driven by the power battery, wherein the first electric quantity difference is the difference between the total capacity of the power battery and the current electric quantity of the target vehicle when traveling to the first target site; and when the target vehicle travels to the starting point of the target downhill road section, the target vehicle is controlled to perform energy recovery, wherein performing energy recovery not only can save energy, but also can reduce wear of mechanical brake and unnecessary heat dissipation.

Figure 2:
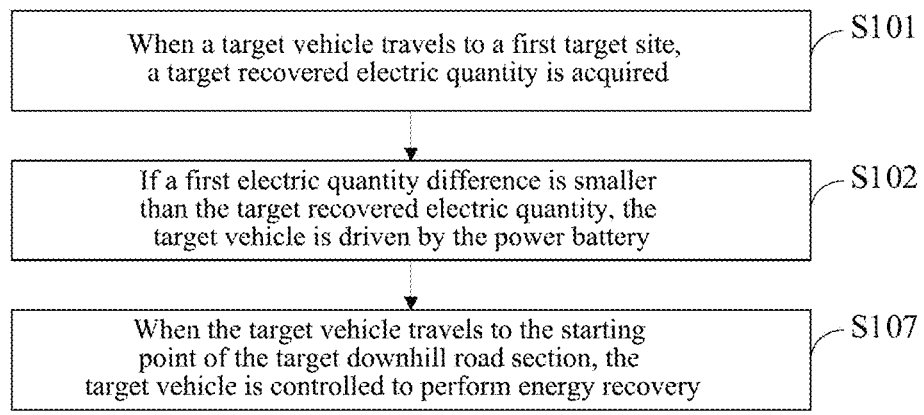
FIG. 2 is a first schematic flow chart of a method for managing a power battery of a vehicle provided in embodiments of the present disclosure.
Figure 4:
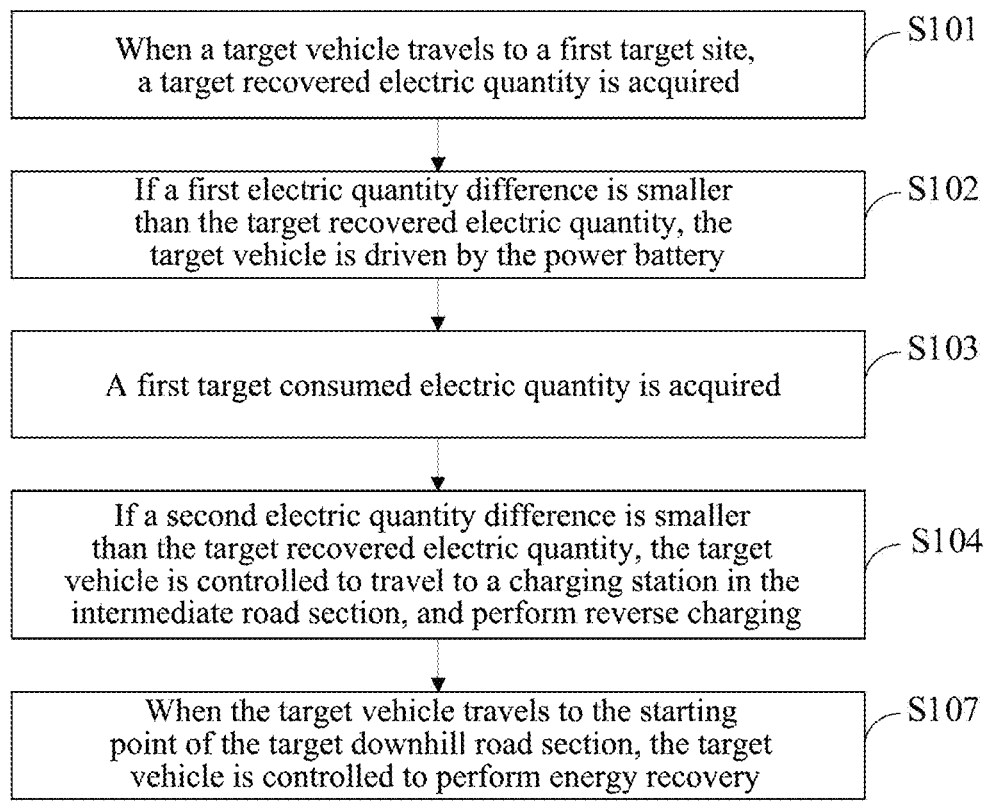
FIG. 4 is a second schematic flow chart of a method for managing a power battery of a vehicle provided in embodiments of the present disclosure.

On the basis of FIG. 2, regarding how to further avoid the occurrence of overflow and waste of recovered electric quantity, the embodiments of the present disclosure further provide a possible implementation. Referring to FIG. 4, if the first electric quantity difference is smaller than the target recovered electric quantity, the method for managing a power battery of a vehicle further includes S103 and S104, which are specifically illustrated as follows.

In S103, a first target consumed electric quantity is acquired.

In the above, the first target consumed electric quantity is an electric quantity required for driving the target vehicle based on the power battery from the first target site to the starting point of the target downhill road section.

In a possible scenario, when the energy recovery is performed while the target vehicle is driven to travel to the starting point of the target downhill road section based on the power battery, the situation that the recovered electric quantity overflows and is wasted may still occur. In order to avoid occurrence of such situation, S103 can be executed to preliminarily estimate the first target consumed electric quantity.

Specifically, the first target consumed electric quantity is acquired based on traffic information, length and road condition of an intermediate road section, wherein the intermediate road section represents a road section between the first target site and the starting point of the target downhill road section.

In S104, if a second electric quantity difference is smaller than the target recovered electric quantity, the target vehicle is controlled to travel to a charging station in the intermediate road section, and perform reverse charging.

In the above, the second electric quantity difference is a sum of the first electric quantity difference and the first target consumed electric quantity, the intermediate road section represents a road section between the first target site and the starting point of the target downhill road section, and a current electric quantity of the power battery after the reverse charging is smaller than a pre-set electric quantity threshold.

It is to be understood that, if the second electric quantity difference is smaller than the target recovered electric quantity, it means that when the energy recovery is performed, the situation of overflow and waste of the recovered electric quantity may still occur. Therefore, the reverse charging needs to be performed at the charging station. The reverse charging refers to charging a charging pile in reverse through the power battery, and electric energy from the reverse charging can be used for charging other vehicles or for mains supply.

It should be indicated that a difference between the total capacity of the power battery and a pre-set current threshold is greater than the target recovered electric quantity, so as to avoid the occurrence of overflow and waste of the recovered electric quantity.

Figure 5:
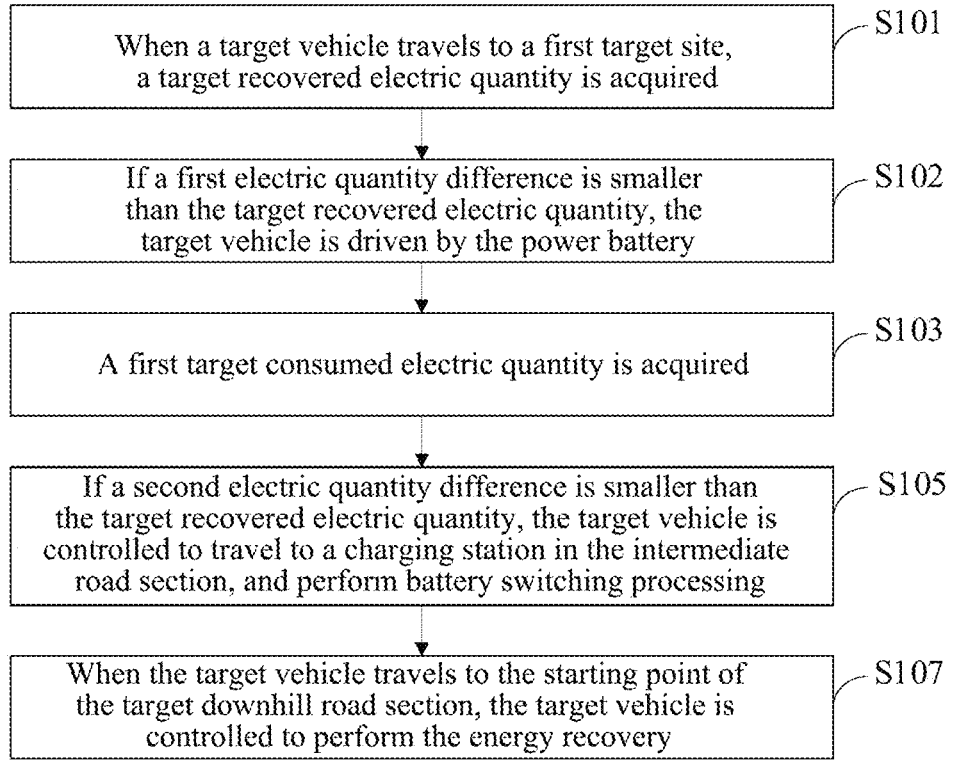
FIG. 5 is a third schematic flow chart of a method for managing a power battery of a vehicle provided in embodiments of the present disclosure.

On the basis of FIG. 2, regarding how to further avoid the occurrence of overflow and waste of the recovered electric quantity, the embodiments of the present disclosure further provide a possible implementation. Referring to FIG. 5, if the first electric quantity difference is smaller than the target recovered electric quantity, the method for managing a power battery of a vehicle further includes S103 and S105, which are specifically illustrated as follows.

In S103, a first target consumed electric quantity is acquired.

In the above, the first target consumed electric quantity is an electric quantity required for driving the target vehicle based on the power battery from the first target site to the starting point of the target downhill road section.

In S105, if a second electric quantity difference is smaller than the target recovered electric quantity, the target vehicle is controlled to travel to a charging station in the intermediate road section, and perform battery switching processing.

In the above, the second electric quantity difference is a sum of the first electric quantity difference and the first target consumed electric quantity, the intermediate road section represents a road section between the first target site and the starting point of the target downhill road section, and a current electric quantity of the power battery after the battery switching processing is smaller than a pre-set electric quantity threshold.

It is to be understood that, similar to S104, in S105, after the battery switching processing, a battery pack with more abundant electric energy can be used for other vehicles, and for a battery pack with a low electric energy, the electric quantity will be recovered after next recovery and charging, thus avoiding waste. The difference between the total capacity of the power battery and the pre-set current threshold is greater than the target recovered electric quantity.

Figure 6:
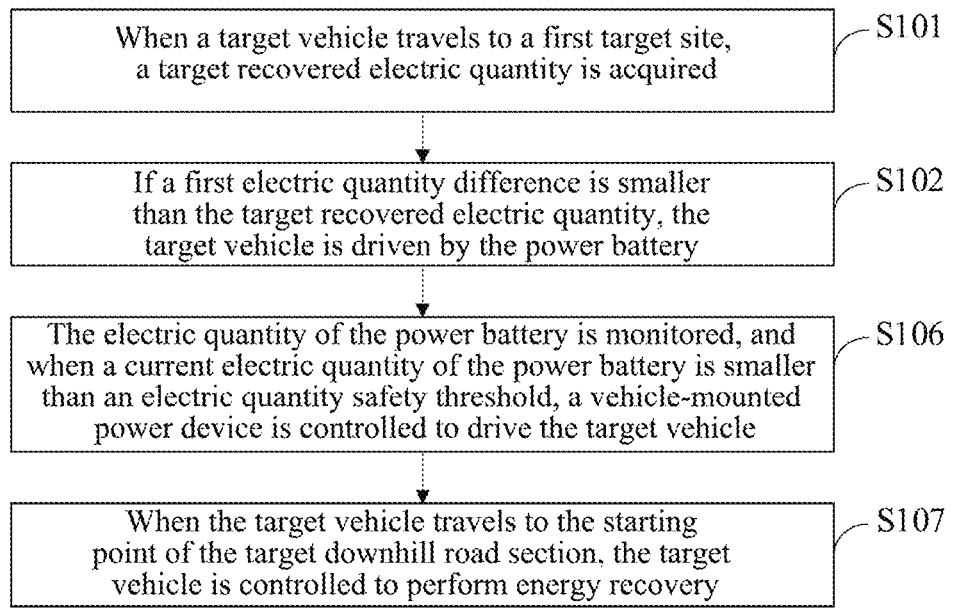
FIG. 6 is a fourth schematic flow chart of a method for managing a power battery of a vehicle provided in embodiments of the present disclosure.

On the basis of FIG. 2, regarding how to protect the power battery and avoid occurrence of feeding, the embodiments of the present disclosure further provide a possible implementation. Referring to FIG. 6, after S102, the method for managing a power battery of a vehicle further includes S106, which is specifically illustrated as follows.

In S106, the electric quantity of the power battery is monitored, and when a current electric quantity of the power battery is smaller than an electric quantity safety threshold, a vehicle-mounted power device is controlled to drive the target vehicle.

In the above, the vehicle-mounted power device may be, but is not limited to, an internal combustion engine, an engine, a generator, and the like.

Figure 7:
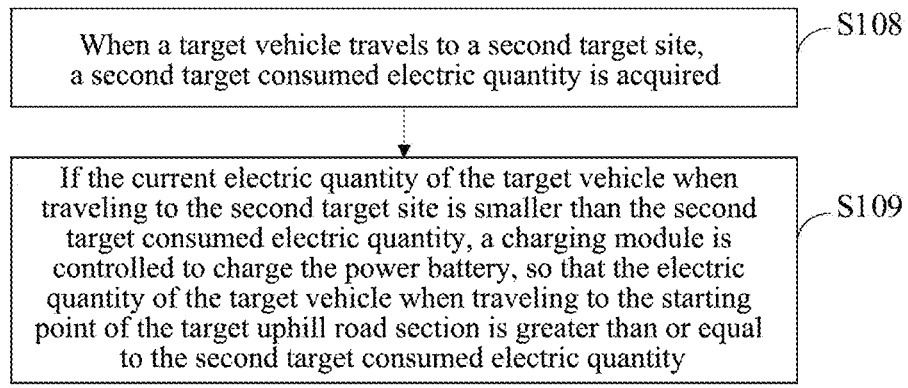
FIG. 7 is a fifth schematic flow chart of a method for managing a power battery of a vehicle provided in embodiments of the present disclosure.

The present disclosure further provides a method for managing a power battery of a vehicle. As shown in FIG. 7, the method for managing a power battery of a vehicle includes S108 and S109, which are specifically illustrated as follows.

In S108, when a target vehicle travels to a second target site, a second target consumed electric quantity is acquired.

In the above, the second target consumed electric quantity is an electric quantity required for the target vehicle to complete travel on a target uphill road section, the second target site is a site located at a fourth pre-set distance before a starting point of the target uphill road section, a distance between the starting point of the target uphill road section and the second target site is equal to the fourth pre-set distance, and the target uphill road section is a road section that has an uphill length greater than a fifth pre-set length and an uphill gradient greater than a sixth pre-set gradient.

Figure 8:
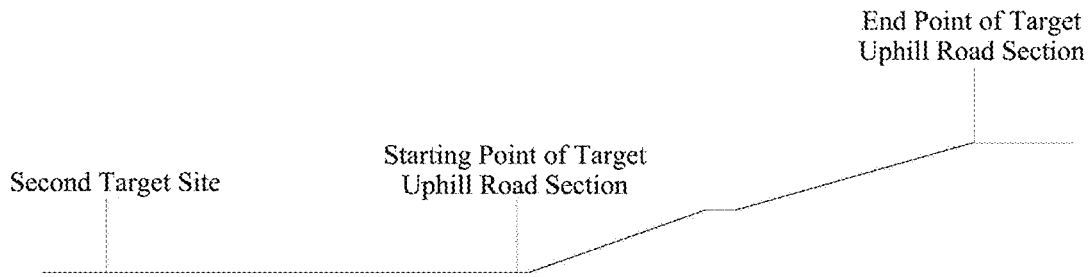
FIG. 8 is a schematic diagram of a second target site provided in embodiments of the present disclosure.

Referring to FIG. 8, FIG. 8 is a schematic diagram of one type of the second target site provided in embodiments of the present disclosure. As shown in FIG. 8, in a driving plan (navigation route) of the target vehicle, the second target site is located in front of the target uphill road section, and is spaced apart from the starting point of the target uphill road section by the fourth pre-set distance, where the fourth pre-set distance is an appointed value configured in advance.

It is to be noted that the target uphill road section may be composed of one or more continuous uphill road sections, for example, two continuous uphill road sections between the starting point and an end point of the target uphill road section constitute the target uphill road section in FIG. 8.

With regard to how to acquire the second target consumed electric quantity, the embodiments of the present disclosure further provide a possible implementation. With reference to the following, S108 includes S108A and S108B, which are specifically illustrated as follows.

In S108A, estimated traffic information, the uphill length and the uphill gradient of the target uphill road section are acquired.

It is to be understood that the estimated traffic information includes any one or more of an estimated average speed, an estimated total number of vehicles and an estimated degree of congestion.

In S101B, by combining the estimated traffic information, the uphill length, the uphill gradient and weather information, the second target consumed electric quantity is acquired.

It is to be understood that S108B is similar to S101B, and will not be repeated herein.

In S109, if the current electric quantity of the target vehicle when traveling to the second target site is smaller than the second target consumed electric quantity, a charging module is controlled to charge the power battery, so that the electric quantity of the target vehicle when traveling to the starting point of the target uphill road section is greater than or equal to the second target consumed electric quantity.

Optionally, the target vehicle in the solutions of the present disclosure is provided therein with a sensor, including, but not limited to, built-in devices in vehicle, such as a visible light camera, an infrared camera, a laser radar, a millimeter-wave radar, an ultrasonic sensor, a velocity meter, an accelerometer, a level meter, an electric quantity monitoring device, a fuel gauge, and a clock.

Optionally, the target vehicle in the solutions of the present disclosure is provided therein with a charging module, wherein the charging module can be understood as a power generation device. The power generation device includes, but is not limited to, a power generation form using an internal combustion engine (a gasoline engine, a diesel engine), a gas turbine, a vehicle-mounted photovoltaic panel, a vehicle-mounted windmill, etc., and an electromechanical structure thereof includes, but is not limited to, series hybrid, parallel hybrid, pure electric drive and other structural forms.

In a possible implementation, the method for managing a power battery of a vehicle further includes S110, Sl11 and S112, which are specifically illustrated as follows.

In S110, based on a current position and an end point of a driving plan, a target road section of travelling is determined.

In S111, a total consumed energy is acquired based on elevation information, traffic information and weather information about the target road section.

Specifically, the elevation information includes a downhill length and a downhill gradient of a downhill road section, an uphill length and an uphill gradient of an uphill road section, a length of a flat road section, and the like. A consumed electric quantity and a recovered electric quantity of the target vehicle in each road section are acquired respectively, so that the total consumed energy can be determined.

In S112, based on a current electric quantity of the power battery, the total consumed energy and a fuel reserve of the target vehicle, it is judged whether the target vehicle can safely travel to the end point of the driving plan without fuel supplement, and if not, reminder of fuel supplement is given, and energy surplus early warning is completed.

In a possible implementation, the method for managing a power battery of a vehicle further includes S113, which is specifically illustrated as follows.

In S113, when the target vehicle travels to continuous undulating road sections, an upper charging limit is smaller than the total capacity of the power battery during charging of the power battery.

In the above, the continuous undulating road sections consist of N uphill road sections and M downhill road sections that alternately appear, and a length of a single road section is smaller than a pre-set length threshold.

Figure 9:
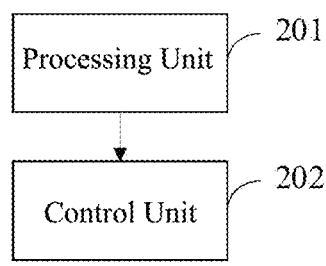
FIG. 9 is a schematic diagram of units of an apparatus for managing a power battery of a vehicle provided in embodiments of the present disclosure.

Referring to FIG. 9, FIG. 9 is an apparatus for managing a power battery of a vehicle provided in embodiments of the present disclosure. Optionally, the apparatus for managing a power battery of a vehicle is applied to the electronic device described above.

The apparatus for managing a power battery of a vehicle includes: a processing unit 201 and a control unit 202.

The processing unit 201 is configured to acquire, when a target vehicle travels to a first target site, a target recovered electric quantity.

In the above, the target recovered electric quantity is a total electric quantity that can be charged to the power battery by energy recovery for the target vehicle when passing through a target downhill road section, a distance between the starting point of the target downhill road section and the first target site is equal to the first pre-set distance, and the target downhill road section is a road section that has a downhill length greater than a second pre-set length and a downward gradient greater than a third pre-set gradient.

The control unit 202 is configured to control, if a first electric quantity difference is smaller than the target recovered electric quantity, the target vehicle to be driven by the power battery.

In the above, the first electric quantity difference is a difference between a total capacity of the power battery and a current electric quantity of the target vehicle when traveling to the first target site.

The control unit 202 is further configured to control, when the target vehicle travels to the starting point of the target downhill road section, the target vehicle to perform energy recovery.

Optionally, the processing unit 201 may execute the above S101, S103, S108 and S110-S112, and the control unit 202 may execute the above S102, S104-S107, S109 and S113.

It should be indicated that the apparatus for managing a power battery of a vehicle provided in the present embodiment may execute method flows shown in the above method flow embodiments, so as to achieve corresponding technical effects. For brief description, for parts which are not mentioned in the present embodiment, reference can be made to corresponding contents in the above embodiments.

Embodiments of the present disclosure further provide a storage medium, wherein the storage medium stores a computer instruction and a program, and when the computer instruction and program are read and run, the above method for managing a power battery of a vehicle in the above embodiments is executed. The storage medium may include an internal storage, a flash memory, a register, a combination thereof, or the like.

An electronic device is provided below, which may be a driving computer device in a vehicle, or a server device in communicative connection with the driving computer device. As shown in FIG. 1, the electronic device can implement the above method for managing a power battery of a vehicle. Specifically, the electronic device includes a processor 10, a memory, and a bus 12. The processor 10 may be a CPU. The memory 11 is configured to store one or more programs, and when the one or more programs are executed by the processor 10, the method for managing a power battery of a vehicle in the above embodiments is implemented.

The above-mentioned are merely for preferred embodiments of the present disclosure, but are not intended to limit the present disclosure. For those skilled in the art, various modifications and changes could be made to the present disclosure. Any modifications, equivalent substitutions, improvements and so on made within the spirit and principle of the present disclosure should be covered within the scope of protection of the present disclosure.

For those skilled in the art, the present disclosure obviously is not limited to details of the above exemplary embodiments, and the present disclosure could be implemented in other specific forms, without departing from the spirit or basic characteristics of the present disclosure. Thus, no matter from which point of view, the embodiments should be regarded as exemplary and non-limiting, and the scope of the present disclosure is defined by the appended claims rather than the above description. Therefore, all changes falling within the meaning and scope of equivalents of the claims are intended to be covered within the present disclosure. Any reference signs in the claims should not be regarded as limiting the claims involved.

What is claimed is:

1. A method for managing a power battery of a vehicle, comprising steps of: acquiring, when a target vehicle travels to a first target site, a target recovered electric quantity,
   wherein the target recovered electric quantity is a total electric quantity that can be charged to the power battery by energy recovery for the target vehicle when passing through a target downhill road section, the first target site is a site located at a first pre-set distance before a starting point of the target downhill road section, and the target downhill road section is a road section that has a downhill length greater than a second pre-set length and a downward gradient greater than a third pre-set gradient;
   driving, if a first electric quantity difference is smaller than the target recovered electric quantity, the target vehicle by the power battery,
   wherein the first electric quantity difference is a difference between a total capacity of the power battery and a current electric quantity of the target vehicle when traveling to the first target site;
   acquiring a first target consumed electric quantity, wherein the first target consumed electric quantity is an electric quantity required for driving the target vehicle based on the power battery from the first target site to the starting point of the target downhill road section;
   controlling, if a second electric quantity difference is smaller than the target recovered electric quantity, the target vehicle to travel to a charging station in an intermediate road section, and perform reverse charging or battery switching processing,
   wherein the second electric quantity difference is a sum of the first electric quantity difference and the first target consumed electric quantity, the intermediate road section represents a road section between the first target site and the starting point of the target downhill road section, and a current electric quantity of the power battery after the reverse charging or the battery switching processing is smaller than a pre-set electric quantity threshold;
   controlling, when the target vehicle travels to the starting point of the target downhill road section, the target vehicle to perform energy recovery,
   wherein the step of acquiring, when a target vehicle travels to a first target site, a target recovered electric quantity, comprises: acquiring estimated traffic information corresponding to the target downhill road section when the target vehicle travels to the target downhill road section, wherein the estimated traffic information comprises any one or more of an estimated average speed, an estimated total number of vehicles and an estimated degree of congestion; and acquiring, based on the estimated traffic information, the downhill length, a downhill gradient and corresponding weather information of the target downhill road section, the target recovered electric quantity.

2. The method for managing a power battery of a vehicle according to claim 1, wherein after driving the target vehicle by the power battery, the method further comprises:
monitoring an electric quantity of the power battery, and when a current electric quantity of the power battery being smaller than an electric quantity safety threshold, controlling a vehicle-mounted power device to drive the target vehicle.

3. The method for managing a power battery of a vehicle according to claim 1, further comprising steps of:
acquiring, when the target vehicle travels to a second target site, a second target consumed electric quantity, wherein the second target consumed electric quantity is an electric quantity required for the target vehicle to complete travel on a target uphill road section, the second target site is a site located at a fourth pre-set distance before a starting point of the target uphill road section, and the target uphill road section is a road section that has an uphill length greater than a fifth pre-set length and an uphill gradient greater than a sixth pre-set gradient; and
controlling, if the current electric quantity of the target vehicle when traveling to the second target site is smaller than the second target consumed electric quantity, a charging module to charge the power battery, so that an electric quantity of the target vehicle when traveling to the starting point of the target uphill road section is greater than or equal to the second target consumed electric quantity.

4. The method for managing a power battery of a vehicle according to claim 3, wherein the step of acquiring the second target consumed electric quantity comprises:
acquiring estimated traffic information, the uphill length and the uphill gradient of the target uphill road section; and
acquiring, by combining the estimated traffic information, the uphill length, the uphill gradient and weather information, the second target consumed electric quantity.

5. The method for managing a power battery of a vehicle according to claim 1, wherein in the method:
when the target vehicle travels to continuous undulating road sections, an upper charging limit is smaller than the total capacity of the power battery during charging of the power battery, and
wherein the continuous undulating road sections consist of N uphill road sections and M downhill road sections that alternately appear, and a length of a single road section of the continuous undulating road sections is smaller than a pre-set length threshold.

6. A computer-readable storage medium, storing a computer program thereon, wherein the computer program, when executed by a processor, implements the method according to claim 1.

7. An electronic device, comprising a processor and a memory, wherein the memory is configured to store one or more programs, and the one or more programs, when executed by the processor, implements the method according to claim 1.

* * * * *